(12) United States Patent
Li et al.

(10) Patent No.: US 11,515,538 B2
(45) Date of Patent: Nov. 29, 2022

(54) IN-SITU POLYMERIZATION TO PROTECT LITHIUM METAL ELECTRODES

(71) Applicant: GM GLOBAL TECHNOLOGY OPERATIONS LLC, Detroit, MI (US)

(72) Inventors: Binsong Li, Troy, MI (US); Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 244 days.

(21) Appl. No.: 16/599,714

(22) Filed: Oct. 11, 2019

(65) Prior Publication Data

US 2021/0111407 A1   Apr. 15, 2021

(51) Int. Cl.
| | |
|---|---|
| H01M 4/60 | (2006.01) |
| C08G 77/16 | (2006.01) |
| H01M 4/13 | (2010.01) |
| C08G 77/20 | (2006.01) |
| C08G 77/22 | (2006.01) |
| H01M 4/02 | (2006.01) |

(52) U.S. Cl.
CPC .......... *H01M 4/604* (2013.01); *C08G 77/16* (2013.01); *C08G 77/20* (2013.01); *C08G 77/22* (2013.01); *H01M 4/13* (2013.01); *H01M 2004/028* (2013.01)

(58) Field of Classification Search
CPC ........ C08G 77/16; C08G 77/20; C08G 77/22; H01M 4/382; H01M 4/134; H01M 4/1395; H01M 4/38
See application file for complete search history.

(56) References Cited

U.S. PATENT DOCUMENTS

| | | | |
|---|---|---|---|
| 8,974,946 B2 | 3/2015 | Cai et al. | |
| 9,123,939 B2 | 9/2015 | Xiao et al. | |
| 9,160,036 B2 | 10/2015 | Yang et al. | |
| 9,246,173 B2 * | 1/2016 | Gerbec | C08G 77/58 |
| 9,252,411 B2 | 2/2016 | Abd Elhamid et al. | |
| 9,302,914 B2 | 4/2016 | Liu et al. | |
| 9,362,552 B2 | 6/2016 | Sohn et al. | |
| 9,373,829 B2 | 6/2016 | Xiao et al. | |
| 9,437,871 B2 | 9/2016 | Zhou et al. | |

(Continued)

FOREIGN PATENT DOCUMENTS

| | | |
|---|---|---|
| CN | 112652756 A | 4/2021 |
| DE | 102020125026 A1 | 4/2021 |
| WO | 2017045573 A1 | 3/2017 |

*Primary Examiner* — Amanda C. Walke
(74) *Attorney, Agent, or Firm* — Harness, Dickey & Pierce, P.L.C.

(57) ABSTRACT

An electrode including an electrode active material including lithium (Li) and a polymer layer coating at least a portion of the electrode active material is provided. The polymer layer includes a polymerization product of a monomer having Formula I:

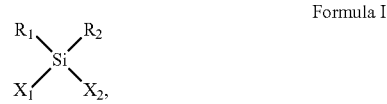

Formula I where $R_1$ and $R_2$ are independently an aryl or a branched or unbranched $C_1$-$C_{10}$ alkyl and $X_1$ and $X_2$ are independently chlorine (Cl), bromine (Br), or iodine (I).

20 Claims, 8 Drawing Sheets

(56) References Cited

U.S. PATENT DOCUMENTS

| | | |
|---|---|---|
| 9,537,144 B2 | 1/2017 | Huang et al. |
| 9,647,254 B2 | 5/2017 | Dadheech et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,862,105 B2 * | 12/2020 | Gronwald ............ H01M 50/403 |
| 2008/0069944 A1 * | 3/2008 | Muldoon .............. H01M 4/134 427/372.2 |
| 2015/0056387 A1 | 2/2015 | Dadheech et al. |
| 2015/0056493 A1 | 2/2015 | Dadheech et al. |
| 2015/0349307 A1 | 12/2015 | Dadheech et al. |
| 2016/0056507 A1 | 2/2016 | Eberle |
| 2016/0111721 A1 | 4/2016 | Xiao et al. |
| 2016/0172706 A1 | 6/2016 | Xiao et al. |
| 2016/0172710 A1 | 6/2016 | Liu et al. |
| 2016/0336621 A1 * | 11/2016 | Yokomizo ......... H01M 10/0525 |
| 2017/0062830 A1 * | 3/2017 | Bao ....................... H01M 4/661 |
| 2017/0162859 A1 | 6/2017 | Yang et al. |
| 2017/0214079 A1 | 7/2017 | Dai et al. |
| 2017/0271678 A1 | 9/2017 | Yang et al. |
| 2017/0338490 A1 | 11/2017 | Xiao et al. |
| 2018/0309165 A1 | 10/2018 | Yersak et al. |
| 2018/0309166 A1 | 10/2018 | Yersak et al. |
| 2018/0375148 A1 | 12/2018 | Yersak et al. |
| 2019/0112453 A1 * | 4/2019 | Kim ........................ C09C 1/407 |
| 2019/0294513 A1 * | 9/2019 | Marripudi ........... G06F 11/2092 |
| 2019/0379087 A1 * | 12/2019 | Oh ....................... H01M 10/052 |
| 2020/0203710 A1 * | 6/2020 | Li ................... H01M 4/134 |
| 2021/0057752 A1 * | 2/2021 | Jiang ................. H01M 10/0525 |
| 2021/0135192 A1 * | 5/2021 | Gronwald ............. H01M 4/134 |
| 2022/0020989 A1 * | 1/2022 | Mukai .................. H01M 4/625 |

* cited by examiner

IN-SITU POLYMERIZATION TO PROTECT LITHIUM METAL ELECTRODES

GOVERNMENT SUPPORT

This invention was made with government support under DE-0007787 awarded by the Department of Energy. The government has certain rights in the invention.

INTRODUCTION

This section provides background information related to the present disclosure which is not necessarily prior art.

Electrochemical energy storage devices, such as lithium-ion batteries, can be used in a variety of products, including automotive products, such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. In electrochemical cells, such as in lithium-ion batteries, one of the two electrodes serves as a positive electrode or cathode, and the other electrode serves as a negative electrode or anode. Conventional rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions (or sodium ions in the case of sodium-ion batteries) between the electrodes and, like the two electrodes, may be in a solid form, a liquid form, or a solid-liquid hybrid form. In the instances of solid-state batteries, which include a solid-state electrolyte disposed between solid-state electrodes, the solid-state electrolyte physically separates the electrodes so that a distinct separator is not required.

Lithium-ion batteries that include a lithium metal anode are promising in that lithium metal has a high theoretical specific capacity of about 3860 mAh/g, a low density of about 0.53 g/cm$^3$, and a low negative electrochemical potential of about −3.040 V versus a standard hydrogen electrode. However, lithium metal anodes are subject to high reactivity and large volume changes that lead to a mossy structure, low cycle efficiency, and dendrite growth. Lithium metal anodes can be treated with monochlorosilanes, such as chlorotrimethylsilane, to form a siloxane layer to help improve the cycle efficiency and decrease dendrite formation, but this treatment does not survive in high current density cycling. Accordingly, lithium metal anode treatments that improve cycle efficiency and decrease dendrite formation in high current density cycling are desirable.

SUMMARY

This section provides a general summary of the disclosure, and is not a comprehensive disclosure of its full scope or all of its features.

In various aspects, the current technology provides an electrode including an electrode active material including lithium (Li) and a polymer layer coating at least a portion of the electrode active material, wherein the polymer layer includes a polymerization product of a monomer having Formula I:

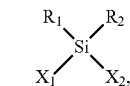

Formula I where $R_1$ and $R_2$ are independently an aryl or a branched or unbranched $C_1$-$C_{10}$ alkyl and $X_1$ and $X_2$ are independently chlorine (Cl), bromine (Br), or iodine (I).

In one aspect, at least one of $R_1$ or $R_2$ is phenyl.

In one aspect, the phenyl is substituted with at least one $C_1$-$C_{10}$ alkyl, a halide, or combinations thereof.

In one aspect, at least one of $R_1$ or $R_2$ is (diphenylphosphino)phenyl.

In one aspect, at least one of $R_1$ or $R_2$ is fluorenyl.

In one aspect, at least one of $R_1$ or $R_2$ is $C_1$-$C_{10}$ alkyl.

In one aspect, the polymerization product comprises a polymer of Formula II:

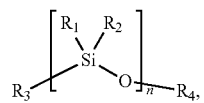

Formula II where $R_1$ and $R_2$ are defined in regard to Formula I; $R_3$ is $X_1$, $X_2$, —OH from a surface of the electrode active material, or —OLi from a surface of the electrode active material; $R_4$ is Li from a surface of the electrode active material, hydrogen (H) from a surface of the electrode active material, or —SiR$_1$R$_2$X$_{1/2}$; and n is an integer greater than 2.

In one aspect, the polymer layer is substantially free of pores.

In one aspect, the electrode active material is disposed on a current collector.

In one aspect, the electrode active material is Li metal.

In one aspect, the electrode active material includes a Li alloy including the Li and at least one of aluminum (Al), tin (Sn), antimony (Sb), germanium (Ge), or silicon (Si).

In one aspect, the electrode is an anode positioned in a battery that cycles Li ions.

In one aspect, an electrochemical cell includes the electrode.

In various aspects, the current technology also provides an electrode including an electrode active material including lithium (Li) and a polymer layer coating at least a portion of the electrode active material, wherein the polymer layer includes a polymer having Formula II:

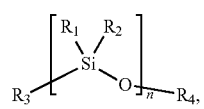

Formula II where $R_1$ and $R_2$ are independently an aryl or a branched or unbranched $C_1$-$C_{10}$ alkyl; $R_3$ is chlorine (Cl), bromine (Br), iodine (I), —OH from a surface of the electrode active material, or —OLi from a surface of the electrode active material; $R_4$ is Li from a surface of the electrode active material, hydrogen (H) from a surface of the electrode active material, or —SiR$_1$R$_2$X$_{1/2}$; and n is an integer greater than 2.

In one aspect, the electrode is an anode and $R_1$ and $R_2$ are the same.

In one aspect, $R_1$ and $R_2$ are both phenyl, (diphenylphosphino)phenyl, tolyl, butylphenyl, fluorenyl, or mesityl.

In various aspects, the current technology further provides a method of fabricating an electrode, the method including applying a monomer solution to at least one surface of an electrode active material including lithium (Li), the monomer solution including a monomer having Formula I:

Formula I where $R_1$ and $R_2$ are independently an aryl or a branched or unbranched $C_1$-$C_{10}$ alkyl and $X_1$ and $X_2$ are independently chlorine (Cl), bromine (Br), or iodine (I), and polymerizing the monomer to form a polymer layer coating at least a portion of the electrode active material.

In one aspect, the applying includes contacting the at least one surface of the electrode active material with the monomer solution for a time of greater than or equal to about 30 seconds to less than or equal to about 10 minutes, during which time the polymerizing occurs spontaneously to form the polymer layer.

In one aspect, the method further includes rinsing the polymer layer with an inert solvent.

In one aspect, $R_1$ and $R_2$ are the same and $X_1$ and $X_2$ are the same.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
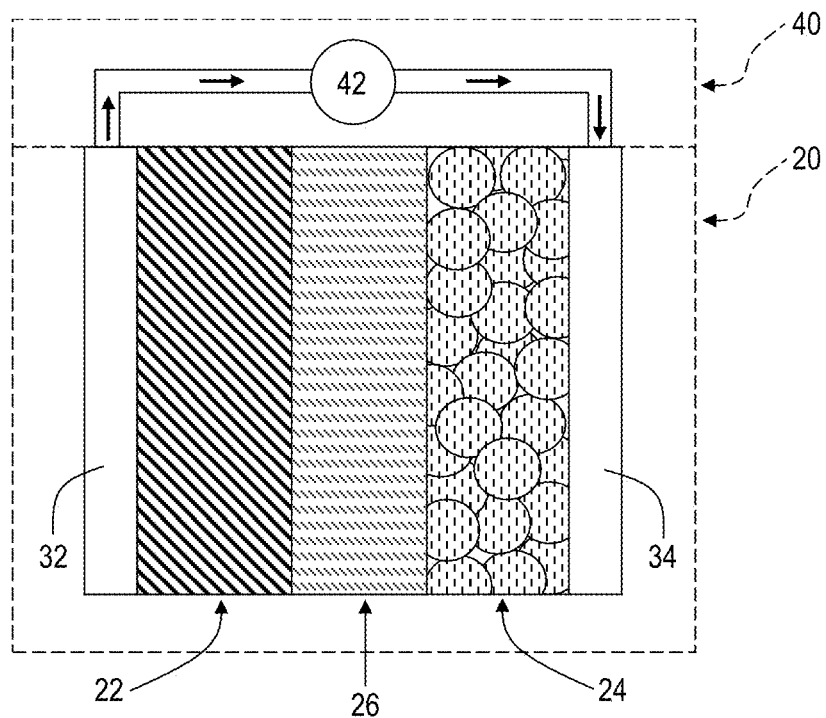
FIG. 1 is an illustration of an electrochemical cell including a separator and a liquid electrolyte in accordance with various aspects of the current technology.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology provides electrodes that comprise lithium metal or a lithium alloy that are coated with polysiloxanes. The polysiloxanes have a high rigidity, adhesion, and stability, resulting in improved cycle efficiency and extended lifetime of the electrodes relative to corresponding electrodes having a siloxane coating derived from, for example, monochlorosilanes. Methods of fabricating electrodes with polysiloxane coatings are also provided.

An exemplary schematic illustration of an electrochemical cell 20 that cycles lithium ions (also referred to as the battery, which comprises at least one electrochemical cell) is shown in FIG. 1. The battery 20 includes a negative electrode (i.e., an anode) 22, a positive electrode (i.e., a cathode) 24, and a separator 26 (e.g., a microporous polymeric separator) disposed between the electrodes 22, 24. An electrolyte, i.e., a liquid electrolyte or an electrolyte solution, is present throughout the separator 26 and, optionally, in the negative electrode 22 and positive electrode 24. A negative electrode current collector 32 may be positioned at or near the negative electrode 22, and a positive electrode current collector 34 may be positioned at or near the positive electrode 24. While not shown, the negative electrode current collector 32 and the positive electrode current collector 34 may be coated on one or both sides, as is known in the art. In certain aspects, the current collectors 32, 34 may be coated with an electrode active material/electrode layer on both sides. The negative electrode current collector 32 and positive electrode current collector 34 respectively collect and move free electrons to and from an external circuit 40 (shown by the block arrows). For example, an interruptible external circuit 40 and a load device 42 may connect the negative electrode 22 (through the negative electrode current collector 32) and the positive electrode 24 (through the positive electrode current collector 34). Composite electrodes can also include a binder, such as polyvinylidene fluoride (PVDF), and/or an electrically conductive carbon, such as carbon black or carbon nanotubes, which is dispersed throughout materials that define the negative electrode 22 and/or the positive electrode 24.

The battery 20 can generate an electric current (indicated by the block arrows) during discharge by way of reversible electrochemical reactions that occur when the external circuit 40 is closed (to connect the negative electrode 22 and the positive electrode 24) and the negative electrode 22 contains a relatively greater quantity of lithium than the positive electrode. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte solution contained in the separator 26 towards the positive electrode 24. The electrons flow through the external circuit 40 and the lithium ions migrate across the separator 26 containing the electrolyte solution to form intercalated lithium at the positive electrode 24. The electric current passing through the external circuit 40 can be harnessed and directed through the load device 42 until the intercalated lithium in the negative electrode 22 is depleted and the capacity of the battery 20 is diminished.

The battery 20 can be charged or re-energized at any time by connecting an external power source to the battery 20 to reverse the electrochemical reactions that occur during battery discharge. The connection of an external electrical energy source to the battery 20 compels the otherwise non-spontaneous oxidation of intercalated lithium at the positive electrode 24 to produce electrons and ions. The electrons, which flow back towards the negative electrode 22 through the external circuit 40, and the ions, which are carried by the electrolyte solution across the separator 26 back towards the negative electrode 22, reunite at the negative electrode 22 and replenish it with lithium for use during the next battery discharge event. As such, each complete discharging event followed by a complete charging event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators, and AC-DC converters connected to an AC electrical power grid through a wall outlet and a motor vehicle alternator.

In many lithium-ion battery configurations, each of the negative electrode current collector 32, the negative electrode 22, the separator 26, the positive electrode 24, and the positive electrode current collector 34 are prepared as relatively thin layers (for example, from several microns to a fraction of a millimeter or less in thickness) and assembled in layers connected in electrical parallel arrangement to provide a suitable electrical energy and power package. In various other instances, the battery 20 may include electrodes 22, 24 that are connected in series. Further, the separator 26 operates as an electrical insulator by being sandwiched between the negative electrode 22 and the positive electrode 24 to prevent physical contact and, thus, the occurrence of a short circuit. In addition to providing a physical barrier between the electrodes 22, 24, the separator 26 acts like a sponge that contains the electrolyte solution in a network of open pores during the cycling of lithium ions to facilitate functioning of the battery 20.

The battery 20 can include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. As noted above, the size and shape of the battery 20 may vary depending on the particular application for which it is designed. Battery-powered vehicles and hand-held consumer electronic devices, for instance, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to the load device 42 that is part of the external circuit 40. The load device 42 may be powered by the electric current passing through the external circuit 40 when the battery 20 is discharging. While the electrical load device 42 may be any number of known electrically powered devices, a few examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

Any appropriate electrolyte, whether in solid form (such as in a solid-state electrochemical cell, see FIG. 2) or solution, capable of conducting lithium ions between the negative electrode 22 and the positive electrode 24 may be used in the lithium-ion battery 20. In certain aspects, the electrolyte solution may be a nonaqueous liquid electrolyte solution that includes a lithium salt dissolved in an organic solvent or a mixture of organic solvents. Numerous conventional nonaqueous liquid electrolyte solutions may be employed in the lithium-ion battery 20. A non-limiting list of lithium salts that may be dissolved in an organic solvent to form the nonaqueous liquid electrolyte solution includes $LiPF_6$, LiFSI, $LiClO_4$, $LiAlCl_4$, LiI, LiBr, LiSCN, $LiBF_4$, $LiB(C_6H_5)_4$, $LiAsF_6$, $LiCF_3SO_3$, $Li(CF_3SO_2)_2N$, and combinations thereof. These and other similar lithium salts may be dissolved in a variety of organic solvents, including, but not limited to, various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethyl methyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 26 operates as both an electrical insulator and a mechanical support. In one embodiment, the microporous polymeric separator 26 comprises a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 26 is a microporous polymeric separator, it may be a single layer or a multi-layer laminate, which may be fabricated from either a dry or wet process. For example, in one embodiment, a single layer of the polyolefin may form the entire microporous polymeric separator 26. In other aspects, the separator 26 may be a fibrous membrane having an abundance of pores extending between the opposing surfaces and may have a thickness of less than a millimeter, for example. As another example, multiple discrete layers of similar or dissimilar polyolefins may be assembled to form the microporous polymeric separator 26. The polyolefins may be homopolymers (derived from a single monomer constituent) or heteropolymers (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), a blend of PE and PP, or multi-layered structured porous films of PE and/or PP. The microporous polymeric separator 26 may also comprise other polymers in addition to the polyolefin, such as, but not limited to, polyethylene terephthalate (PET), polyvinylidene fluoride (PVDF), and/or a polyamide. Furthermore, the microporous polymeric separator 26 may be mixed with a ceramic material or its surface may be coated in a ceramic material. For example, a ceramic coating may include alumina ($Al_2O_3$), silicon dioxide ($SiO_2$), titania ($TiO_2$), or combinations thereof. Commercially available polyolefin porous membranes include CELGARD® 2500 (a monolayer polypropylene separator) and CELGARD® 2320 (a trilayer polypropylene/polyethylene/polypropylene separator), both available from Celgard, LLC. The polyolefin layer and any other optional polymer layers may further be included in the microporous polymeric separator 26 as a fibrous layer to help provide the microporous polymeric separator 26 with appropriate structural and porosity characteristics. Various conventionally available polymers and commercial products for forming the separator 26 are contemplated, as well as the many manufacturing methods that may be employed to produce such microporous polymeric separators 26.

Figure 2:
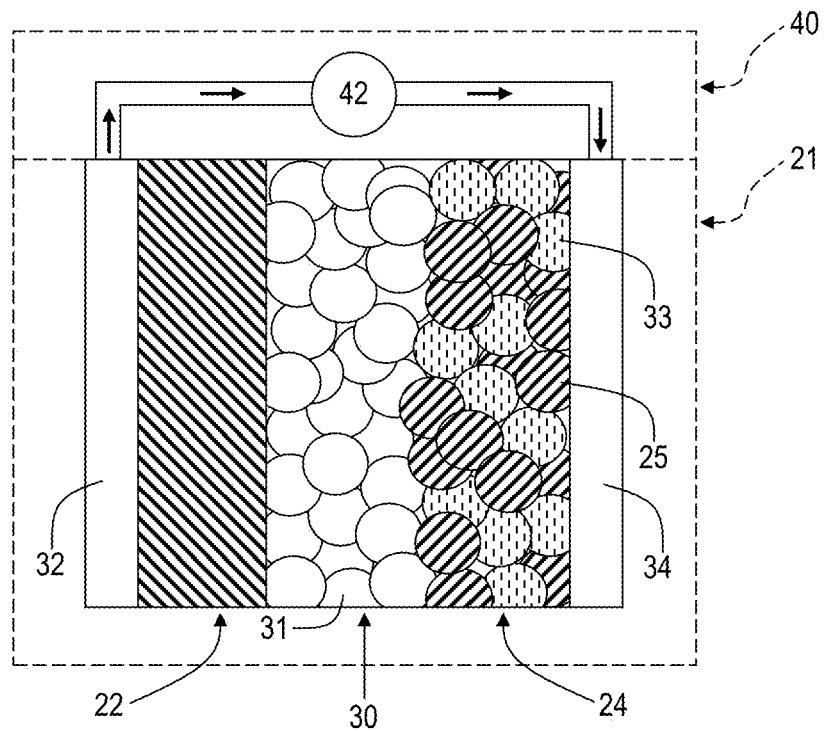
FIG. 2 is an illustration of an electrochemical cell including a solid-state electrolyte in accordance with various aspects of the current technology.

With reference to FIG. 2, the current technology also provides a solid-state electrochemical cell 21 that cycles lithium ions. The solid-state electrochemical cell 21 has a similar structure as the electrochemical cell 20 of FIG. 1, as shown by the numeric identifiers that are common between the figures. However, instead of a microporous separator and a liquid electrolyte, the solid-state electrochemical cell 21 comprises a solid-state electrolyte 30 disposed between the electrodes 22, 24. The solid-state electrolyte 30 is both a separator that physically separates the negative electrode 22 from the positive electrode 24 and an ion-conducting electrolyte. The solid-state electrolyte 30 may be defined by a first plurality of solid-state electrolyte particles 31. In some aspects, the solid-state electrolyte particles 31 comprise a ceramic oxide, such as $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_2PO_2N$ (LIPON), and combinations thereof, as non-limiting examples. Also, as used herein, when a particle or component is "ceramic oxide-based," the particle or component comprises the ceramic oxide. In certain embodiments, the solid-state electrolyte particles 31 optionally comprise a dopant. As non-limiting examples, the dopant comprises aluminum (as $Al^{3+}$, from, for example, $Al_2O_3$), tantalum (as $Ta^{5+}$, from, for example, $TaCl_5$), niobium ($Nb^{5+}$, from, for example, $Nb(OCH_2CH_3)_5$), gallium ($Ga^{3+}$, from, for example, $Ga_2O_3$), indium ($In^{3+}$, from, for example, $In_2O_3$), tin (Se, from, for example, $SnO_4$), antimony ($Sb^{4+}$, from, for example, $Sb_2O_3$), bismuth ($BO^+$, from, for example, $Bi_2O_3$), yttrium ($Y^{3+}$, from, for example, $Y_2O_3$), germanium ($Ge^{4+}$, from, for example, $GeO_2$), zirconium ($Zr^{4+}$, from, for example, $ZrO_2$), calcium ($Ca^{2+}$, from, for example, CaCl), strontium ($Sr^{2+}$, from, for example, SrO), barium (Ba', from, for example, BaO), hafnium ($Hf^{4+}$, from, for example, $HfO_2$), or combinations thereof. Therefore, the stoichiometry of the solid-state electrolyte particles 31 may change when a dopant is present. As used herein, unless indicated otherwise, the solid-state electrolyte particles include their doped variants, e.g., LLZO includes $Li_{7-3x-y}Al_xLa_3Zr_{2-y}M_yO_{12}$, where M is Ta and/or Nb, $0 \le x \le 1$, and $0 \le y \le 1$; $Li_{6.5}La_3Zr_{1.5}M_{0.5}O_{12}$, where M is Nb and/or Ta; $Li_{7-x}La_3Zr_{2-x}Bi_xO_{12}$, where $0 \le x \le 1$; and $Li_{6.5}Ga_{0.2}La_{2.9}Sr_{0.1}Zr_2O_{12}$, as non-limiting examples. Further still, in some variations a second plurality of solid-state electrolyte particles 33, or a liquid electrolyte, are mixed with positive electrode particles 25 to form a continuous electrolyte network, which may be a continuous solid-state electrolyte network or a solid-liquid hybrid electrolyte network. For example, the positive solid-state electroactive particles 25 are mixed with no electrolyte, with the second plurality of solid-state electrolyte particles 33, or with a liquid electrolyte.

Referring back to FIG. 1, the positive electrode 24 may be formed from a lithium-based or sodium-based electrode active material that can sufficiently undergo lithium/sodium intercalation and deintercalation or alloying and dealloying, while functioning as the positive terminal of the battery 20. In various aspects, the positive electrode 24 includes a positive electrode active material in spinel or layered-oxide phases, the positive electrode active material comprising lithium/sodium transition metal oxides or lithium/sodium transition metal polyanions. Non-limiting examples of transition metal oxides include lithium cobalt oxide (LCO, $LiCoO_2$); lithium manganese oxide (LMO, $LiMn_2O_4$); $Li_{1+x}M_{2-x}O_2$, where $0 \le x \le 1$ and M is a transition metal (e.g., Fe, Ni, Mn, Co, Ti, V, and combinations thereof); lithium nickel cobalt manganese oxide (NMC/NCM, $LiNiCoMnO_2$), including $LiNi_xMn_yCo_{1-x-y}O_2$, where $0 \le x \le 1$ and $0 \le y \le 1$; lithium nickel cobalt aluminum oxide (NCA, $LiNiCoAlO_2$); lithium nickel manganese spinel (LNMO, $LiNi_{0.5}Mn_{1.5}O_4$); and $LiNi_xMn_{1-x}O_2$, where $0 \le x \le 1$. Non-limiting examples of transition metal polyanions include phosphates, such as $LiMPO_4$, where M is Fe, Mn, Co, Ni, Zn, V, or combinations thereof, $LiV_2(PO_4)_3$, and $Li_3Fe_3(PO_4)_4$; fluorophosphates, such as $Li_2MPO_4F$, where M is Fe, Mn, Co, Ni, Zn, V, or combinations thereof, $Li_2FePO_4F$, and $Li_3V_2(PO_4)F_3$; pyrophosphates, such as $Li_2MP_2O_7$, where M is Fe, Mn, Co, Ni, Zn, V, or combinations thereof; silicates, such as $Li_2MSiO_4$, where M is Fe, Mn, Co, Ni, Zn, V, or combinations thereof; carbonophosphates, such as $Li_3MCO_3PO_4$ where M is Fe, Mn, Co, Ni, Zn, V, or combinations thereof; sulfates, such as $Li_2M(SO_4)_2$, where M is Fe, Mn, Co, Ni, Zn, V, or combinations thereof; and borates, such as $LiMBO_3$, where M is Fe, Mn, Co, Ni, Zn, V, or combinations thereof. In certain aspects, the positive solid-state electrode active particles may be coated (for example, by $Al_2O_3$) and/or the positive electrode active material may be doped (for example, by magnesium (Mg)).

The positive electrode active materials may be powder compositions. The positive electrode active materials may be intermingled with an optional electrically conductive material (e.g., electrically-conductive particles) and a polymeric binder. The binder may both hold together the positive electrode active material and provide ionic conductivity to the positive electrode 24. The polymeric binder may include polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene fluoride (PVDF), lithium polyacrylate (LiPAA), sodium polyacrylate (NaPAA), sodium alginate, lithium alginate, or combinations thereof.

The positive electrode active material loading in the binder can be large, such as greater than about 80 wt. %. For example, the binder can be present at a level of greater than or equal to about 1 wt. % to less than or equal to about 20 wt. %, optionally greater than or equal to about 1 wt. % to less than or equal to about 10 wt. %, optionally greater than or equal to about 1 wt. % to less than or equal to about 8 wt. %, optionally greater than or equal to about 1 wt. % to less than or equal to about 7 wt. %, optionally greater than or equal to about 1 wt. % to less than or equal to about 6 wt. %, optionally greater than or equal to about 1 wt. % to less than or equal to about 5 wt. %, or optionally greater than or equal to about 1 wt. % to less than or equal to about 3 wt. %.

Electrically conductive materials may include graphite, other carbon-based materials, conductive metals, or conductive polymer particles. Carbon-based materials may include, by way of non-limiting example, particles of KETCHEN™ black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used.

In certain variations, the positive electrode 24 includes the electrically-conductive material in an amount less than or equal to about 15 wt. %, optionally less than or equal to about 10 wt. %, or optionally greater than or equal to about 0.5 wt. % to less than or equal to about 8 wt. %. While the supplemental electrically conductive materials may be described as powders, these materials lose their powder-like character following incorporation into the electrode, where the associated particles of the supplemental electrically conductive materials become a component of the resulting electrode structure.

Figure 3:
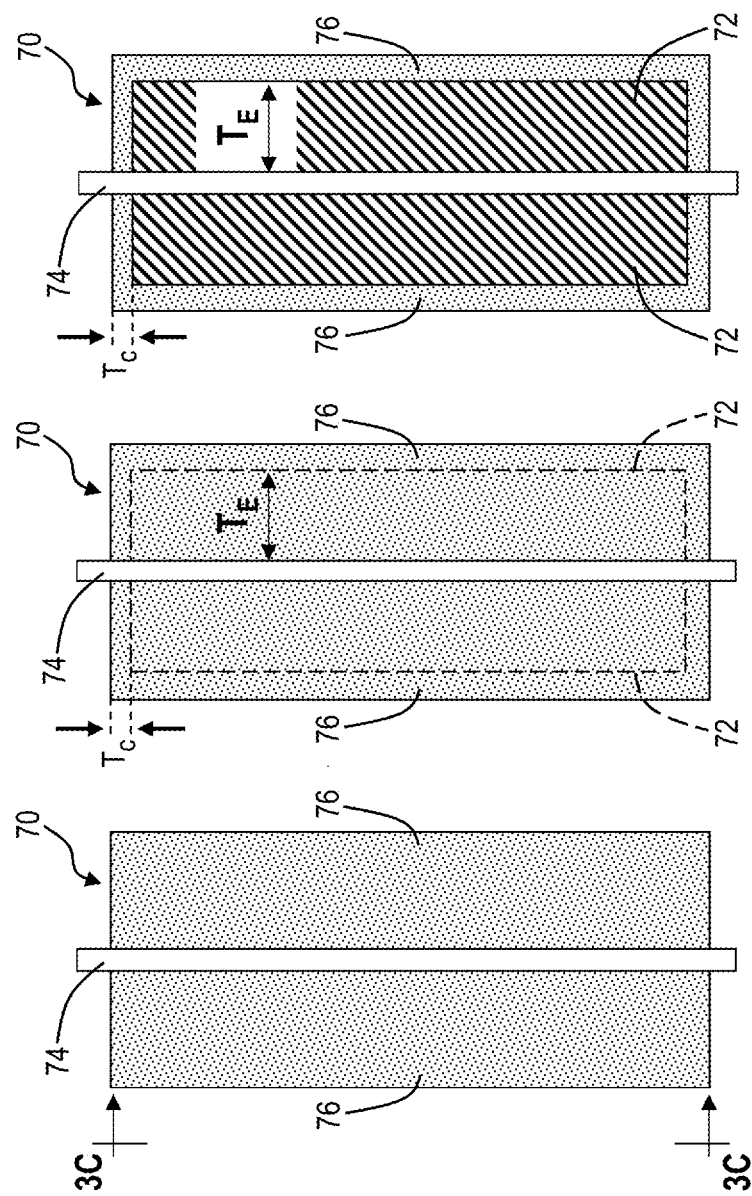
FIG. 3A is an illustration of an electrode having an electrode active material that is coated by a polymer layer in accordance with various aspects of the current technology.
FIG. 3B is an illustration of the electrode of FIG. 3A showing an electrode active material hidden by the polymer layer.
FIG. 3C is a view of the electrode of FIG. 3A after removal of a layer or plane indicated by arrows 3C, which exposes the previously hidden electrode active material.

The negative electrode 22, also referred to as "the anode," provided by the current technology is shown in more detail as an electrode 70 in FIGS. 3A-3C. FIG. 3A shows the electrode 70, FIG. 3B shows the electrode 70 with a hidden interior portion (an electrode active material) indicated by a dashed line, and FIG. 3C is a view of the electrode 70 in FIG. 3A after removal of a layer or plane indicated by arrows 3C, which exposes the interior portion. As shown in the figures, the electrode 70 comprises an electrode active material 72 that is disposed on opposing sides of a current collector 74. However, it is understood that the electrode active material 72 can be disposed on only one side of the current collector 74 (see, for example, FIGS. 1 and 2). The electrode active material 72 comprises lithium. In certain variations, the electrode active material 72 is lithium metal, such as a lithium metal foil. In other variations, the electrode active material 72 comprises a lithium alloy comprising the lithium and at least one of aluminum (Al), tin (Sn), antimony (Sb), germanium (Ge), or silicon (Si). The electrode active material 72 has a thickness TE of greater than or equal to about 500 nm to less than or equal to about 750 µm, greater than or equal to about 750 nm to less than or equal to about 200 µm, greater than or equal to about 1 µm to less than or equal to about 100 µm, or greater than or equal to about 1 µm to less than or equal to about 20 µm, such as a thickness of about 500 nm, about 550 nm, about 600 nm, about 650 nm, about 700 nm, about 750 nm, about 800 nm, about 850 nm, about 900 nm, about 950 nm, 1 µm, about 5 µm, about 10 µm, about 15 µm, about 20 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, about 100 µm, about 150 µm, about 200 µm, about 250 µm, about 300 µm, about 350 µm, about 400 µm, about 450 µm, µm, about 500 µm, about 550 µm, about 600 µm, about 650 µm, about 700 µm, or about 750 µm.

The electrode 70 also comprises a polymer layer 76 that coats at least a portion of the electrode active material 72. By "at least a portion" it is meant that the polymer layer 76 coats greater than or equal to about 75%, greater than or equal to about 80%, greater than or equal to about 85%, greater than or equal to about 90%, greater than or equal to about 95%, or greater than or equal to about 99% of the surface area of the electrode active material 72. As such, the polymer layer 76 can be continuous or discontinuous. However, it is understood that a surface of the electrode active material 72 that is in contact with the current collector 74 may not be coated with the polymer layer 76. Put another way, in certain variations, surfaces of the electrode active material 72 that are exposed when the electrode active material 72 is disposed on the current collector 74 are at least partially coated by the polymer layer 76. In some variations, the polymer layer 76 coats greater than or equal to about 95% of the surface of the electrode active material 72 that is not disposed on the current collector 74 and is substantially free of pores. By "substantially free" it is meant that the polymer layer 76 has a porosity of less than or equal to about 20%, less than or equal to about 15%, less than or equal to about 10%, less than or equal to about 5%, less than or equal to about 2.5%, or less than or equal to about 1%, where "porosity" is a fraction of void volume defined by pores over the total volume of the polymer layer 76.

The polymer layer 76 has a thickness Tc that is greater than or equal to about 1 nm to less than or equal to about 100 µm, greater than or equal to about 100 nm to less than or equal to about 50 µm, or greater than or equal to about 500 nm to less than or equal to about 50 µm.

The polymer layer 76 comprises a polysiloxane that is a polymerization product of a monomer having Formula I:

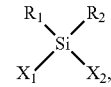

Formula I where $R_1$ and $R_2$ are independently an aryl or a branched or unbranched $C_1$-$C_{10}$ alkyl, $R_1$ and $R_2$ being optionally substituted, and $X_1$ and $X_2$ are independently chlorine (Cl), bromine (Br), or iodine (I).

Figure 4:
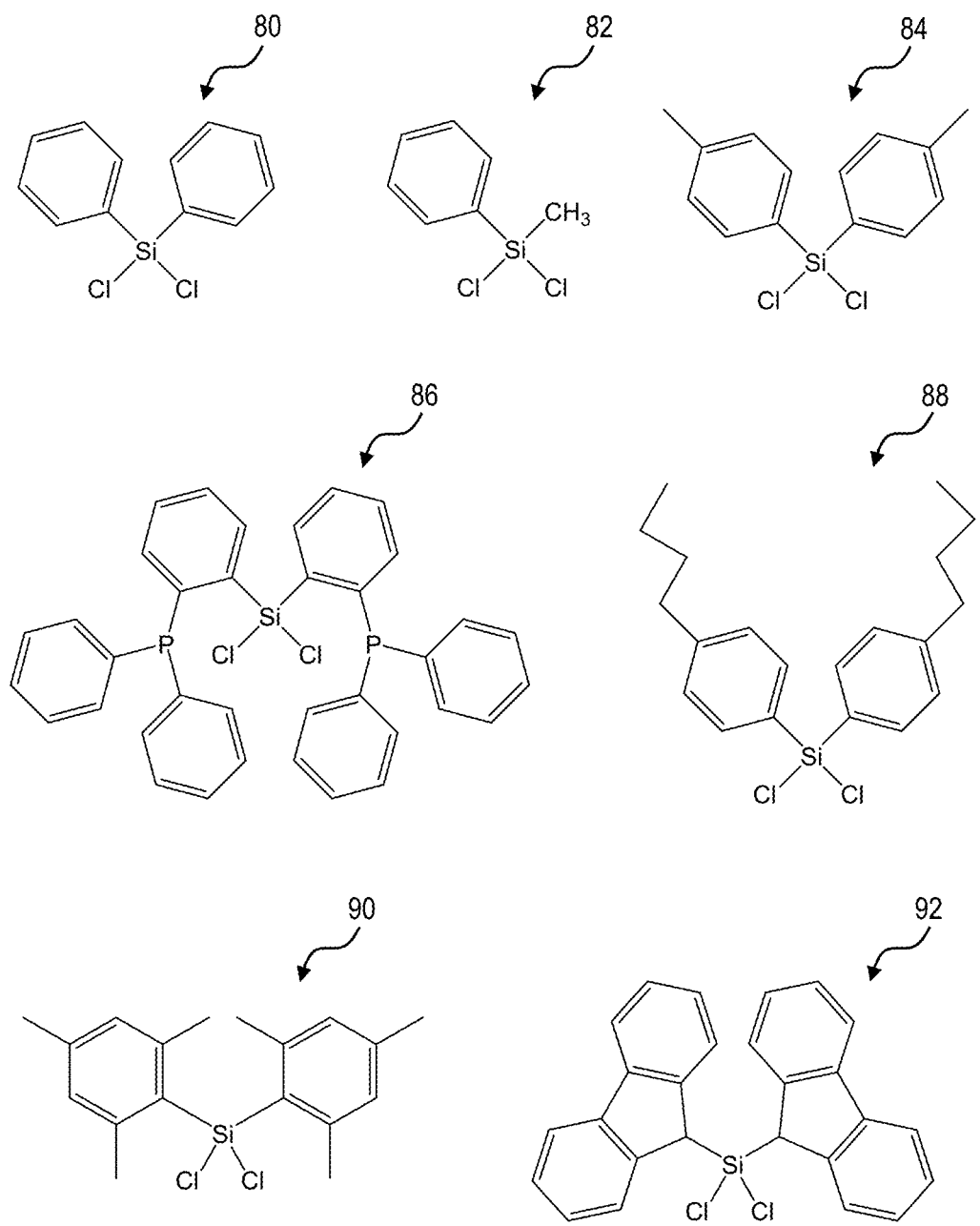
FIG. 4 shows the structure of exemplary monomers in accordance with various aspects of the current technology.

The aryl can be phenyl, (diphenylphosphino)phenyl, or fluorenyl, as non-limiting examples. When phenyl, it is optionally substituted with at least one $C_1$-$C_{10}$ alkyl (e.g., methyl, ethyl, propyl, butyl, pentyl, hexyl, heptyl, octyl, nonyl, and/or decyl), a halide (e.g., F, Cl, Br, and/or I), or combinations thereof. As non-limiting examples, a phenyl substituted with a methyl is tolyl, a phenyl substituted with three methyls is mesityl, and a phenyl substituted with a butyl is butylphenyl. In some variations, $R_1$ and $R_2$ are the same. In other variations, $X_1$ and $X_2$ are the same. In yet other variations, $R_1$ and $R_2$ are the same and $X_1$ and $X_2$ are the same. As shown in FIG. 4, non-limiting examples of monomers corresponding to Formula I include dichlorodiphenyl silane 80, dichloro(methyl)phenyl silane 82, di-p-tolyldichlorosilane 84, bis[2-(diphenylphosphino)phenyl]dichlorosilane 86, bis(4-butylphenyl)-dichlorosilane 88, dimesityldichlorosilane 90, and bis(9H-fluoren-9-yl)dichlorosilane 92.

Referring back to FIGS. 3A-3C, the polymer layer 76 can be liner, branched, or cross-linked. Moreover, the polysiloxane can be a homopolymer where all the monomers are the same or the polysiloxane can be a heteropolymer or copolymer generated from two or more different monomers having Formula I.

The polymerization product of the monomer having Formula I has Formula II:

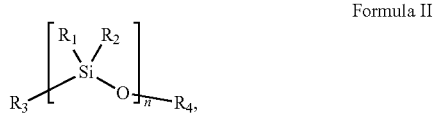

Formula II where $R_1$ and $R_2$ are defined in regard to Formula I; $R_3$ is $X_1$, $X_2$, —OH from a surface of the electrode active material, or —OLi from a surface of the electrode active material; $R_4$ is Li from a surface of the electrode active material, H from a surface of the electrode active material, or —$SiR_1R_2X_{1/2}$; and n is an integer greater than 2, wherein $X_{1/2}$ in —$SiR_1R_2X_{1/2}$ refers to $X_1$ or $X_2$ and —$SiR_1R_2X_{1/2}$ is:

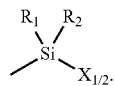

As discussed above, the electrode 70 can be an anode positioned in a battery that cycles lithium ions, such as a lithium-ion battery with a separator and liquid electrolyte or a solid-state lithium-ion battery having a solid-state electrolyte. Accordingly, the current technology provides an electrochemical cell comprising the electrode 70.

Figure 5:
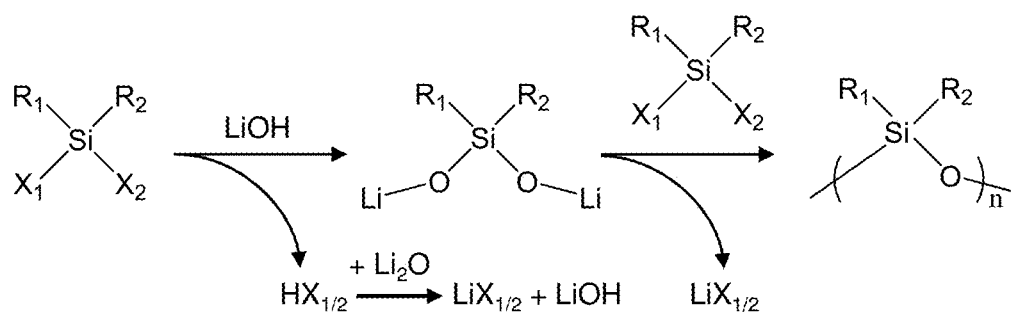
FIG. 5 shows a polymerization reaction for forming a polymer layer on an electrode in accordance with various aspects of the current technology. In the reaction scheme, $X_{1/2}$ refers to $X_1$ or $X_2$ as defined in regard to Formula I.

The current technology also provides a method of fabricating an electrode. In certain variations, the electrode is an anode for a lithium-ion electrochemical cell. The method comprises applying a monomer solution comprising a monomer having Formula I to at least one surface of an electrode active material comprising lithium, such as any lithium metal or lithium alloy discussed herein, and polymerizing the monomer to form a polymer layer that coats at least a portion of the electrode active material. The applying is performed by an method known in the art, such as by dipping, dunking, spraying, pipetting, pouring, or doctor blading, as non-limiting examples. Moreover, the applying comprises contacting the at least one surface of the electrode active material with the monomer solution for a time of greater than or equal to about 30 seconds to less than or equal to about 10 minutes or greater than or equal to about 2 minutes to less than or equal to about 5 minutes, such as for a time of about 30 minutes, about 1 minute, about 1.5 minutes, about 2 minutes, about 2.5 minutes, about 3 minutes, about 3.5 minutes, about 4 minutes, about 4.5 minutes, about 5 minutes, about 5.5 minutes, about 6 minutes, about 6.5 minutes, about 7 minutes, about 7.5 minutes, about 8 minutes, about 8.5 minutes, about 9 minutes, about 9.5 minutes, or about 10 minutes, during which time the polymerizing occurs spontaneously in situ to form the polymer layer. The thickness of the polymer layer increases as the applying time increases. FIG. 5 shows how the monomers react with the electrode surface and with additional monomers to form the polymer layer.

In certain variations, the method further comprises rinsing the polymer layer with an inert solvent. Non-limiting examples of inert solvents that are suitable for the rinsing include tetrahydrofuran (THF), 1,3-dioxolane (DOL), 2-methyltetrahydrofuran (2MeTHF), 2,5-dimethyltetrahydrofuran (2,5-DiMeTHF), ethylene carbonate (EC), propylene carbonate (PC), dimethyl carbonate (DMC), diethyl carbonate (DEC), methyl formate, ethyl formate, methyl acetate, ethyl acetate, valerolactone, γ-butyolactone, diethylether (DEE), 1,2-dimethoxyether (DME), and combinations thereof. The method can also include drying the polymer layer after the rinsing. The drying can be performed by air-drying, by blowing air onto the polymer layer, by heating the polymer layer, by applying a vacuum to the polymer layer, or by combinations thereof.

Embodiments of the present technology are further illustrated through the following non-limiting example.

EXAMPLE

Figure 6:
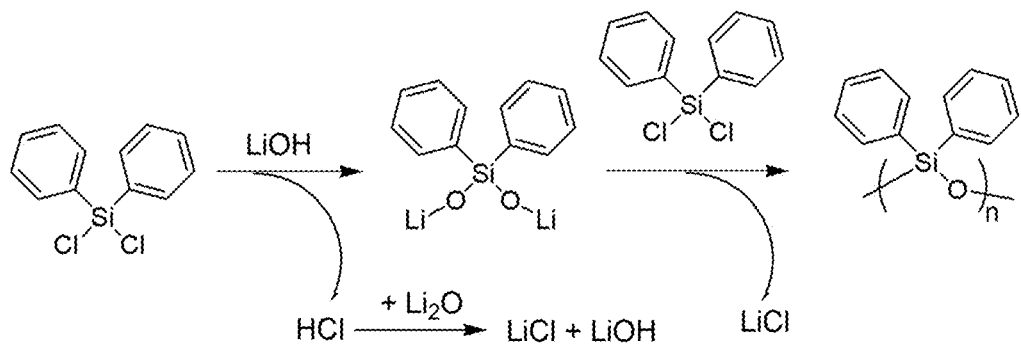
FIG. 6 shows a polymerization reaction for forming a polydiphenylsiloxane layer on an electrode from dichlorodiphenylsilane in accordance with various aspects of the current technology.

A test anode is made by dipping a lithium metal anode into a solution comprising dichlorodiphenylsilane ($Ph_2SiCl_2$) for about three minutes. While the anode is submerged in the $Ph_2SiCl_2$, the $Ph_2SiCl_2$ polymerizes into polydiphenylsiloxane by the reaction shown in FIG. 6. The resulting coated anode is rinsed with tetrahydrofuran or 1,3-dioxolane and air-dried.

A first control anode is uncoated. A second control anode is made by a similar method, but utilizes a solution comprising the monochlorosilane chloro(methyl)diphenylsilane ($Ph_2MeSiCl$). The $Ph_2MeSiCl$ dimerizes to form diphenylmethylsiloxane in a coating layer.

Figure 7A:
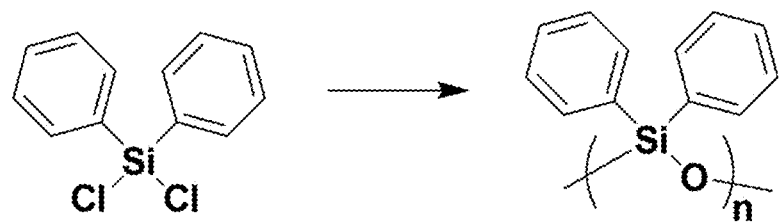
FIG. 7A shows a dichlorodiphenylsilane ($Ph_2SiCl_2$) monomer and the resulting polydiphenylsiloxane generated on a test anode prepared in accordance with various aspects of the current technology.
Figure 7B:
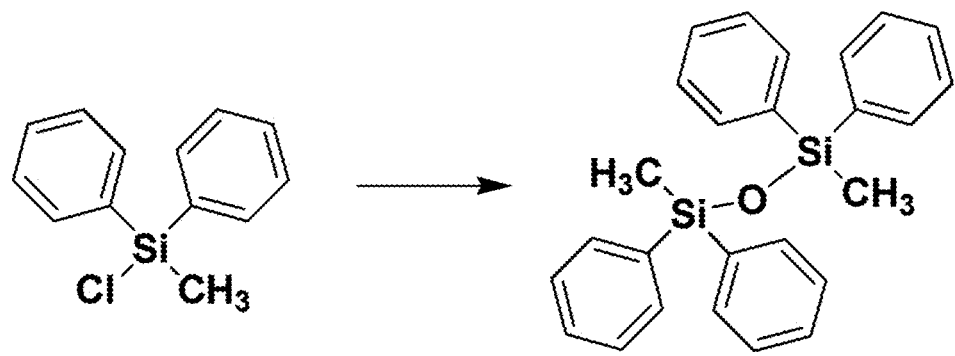
FIG. 7B shows a chloro(methyl)diphenylsilane ($Ph_2MeSiCl$) monomer and the resulting diphenylmethylsiloxane generated on a control anode.

The test anode and the second control anode are placed in lithium symmetric cells using an electrolyte of 1 M $LiPF_6$, EC/DEC 1:2 wt. % with 10 wt. % FEC, 40 μL/$cm^2$, 1 mA/$cm^2$, and 4 mAh/$cm^2$. FIG. 7A shows the starting $Ph_2SiCl_2$ monomer and resulting polydiphenylsiloxane for the test anode, and FIG. 7B shows the starting $Ph_2MeSiCl$ monomer and resulting diphenylmethylsiloxane for the second control anode.

Figure 8:
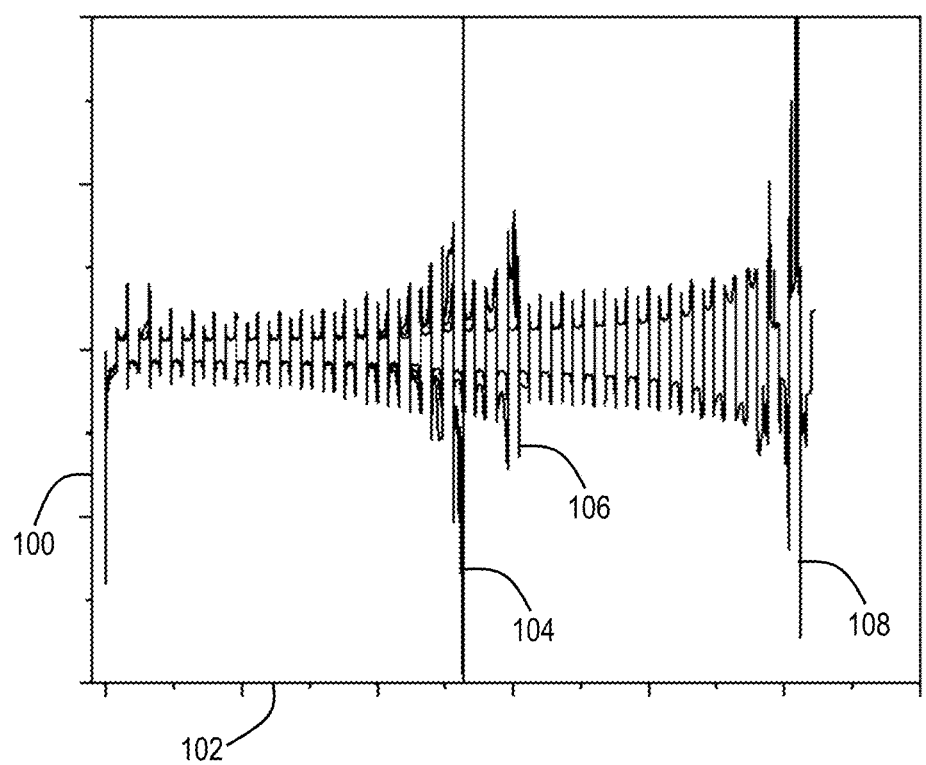
FIG. 8 is a graph showing the impact of dichlorosilane polymerization on battery cycle performance in accordance with various aspects of the current technology. In this figure, numeric identifiers are attached toward the end of each curve.

FIG. 8 is a graph having a γ-axis 100 representing voltage from −1.0 V to 1 V and an x-axis 102 representing time from 0 hours to 300 hours. The lifetime for the first control anode is shown by a first curve 104, the lifetime for the second control anode is shown by a second curve 106, and the lifetime for the test anode is shown by a third curve 108. Although the diphenylmethylsiloxane layer on the second control anode extended the lifetime of the second control anode relative to the first control anode by about 20 hours, the polydiphenylsiloxane extended the lifetime of the test anode relative to the first control anode by about 125 hours. This data shows that the polysiloxane coating obtained from in situ polymerized dichlorosilane is more stable than the siloxane coating from mnochlorosilane, as shown by the relative increased cycle life.

Figure 9A:
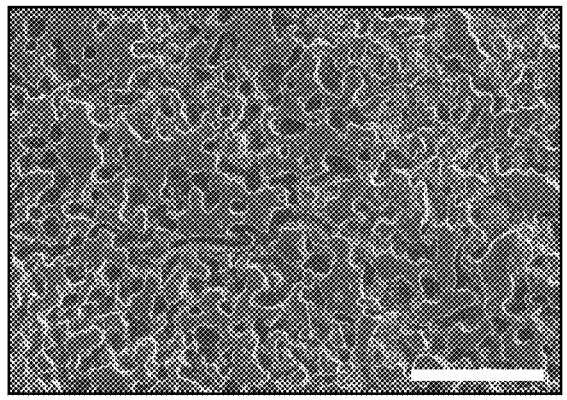
FIG. 9A is a scanning electron micrograph (SEM) image of an uncoated lithium metal anode after first stripping. The scale bar is 300 μm.
Figure 9B:
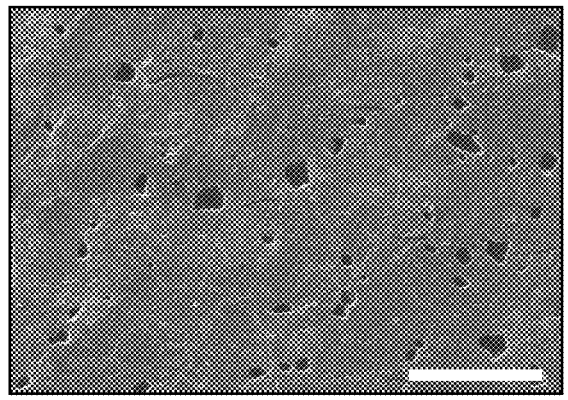
FIG. 9B is a SEM image of a polysiloxane-coated lithium metal anode after first stripping. The scale bar is 300 μm.
Figure 9C:
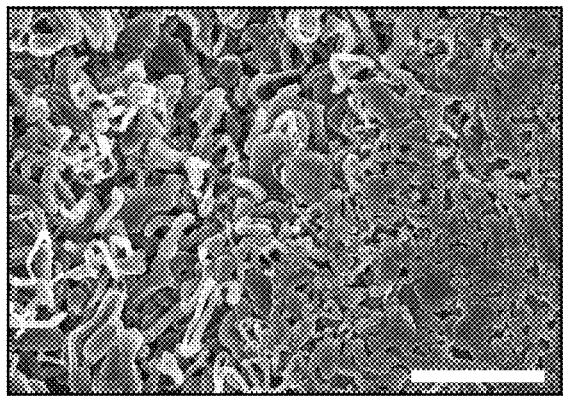
FIG. 9C is a SEM image of paired uncoated lithium metal electrodes after first plating. The scale bar is 15 μm.
Figure 9D:
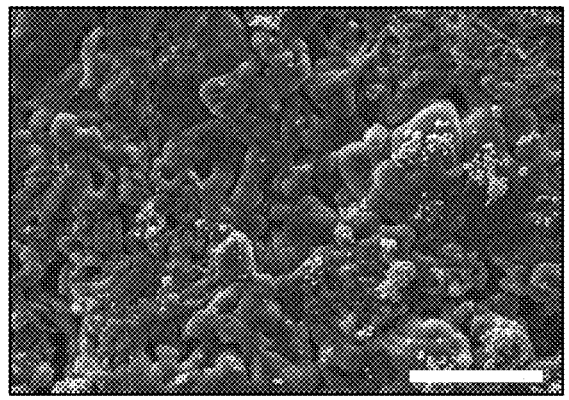
FIG. 9D is a SEM image of paired polysiloxane-coated lithium metal electrodes after first plating. The scale bar is 15 μm.

FIG. 9A is a scanning electron micrograph (SEM) image of the uncoated lithium metal anode after first stripping. FIG. 9B is a SEM image of the polysiloxane-coated lithium metal anode after first stripping. FIG. 9C is a SEM image of paired uncoated lithium metal electrodes after first plating. FIG. 9D is a SEM image of paired polysiloxane-coated lithium metal electrodes after first plating. The polysiloxane-coated lithium metal electrodes show obvious anode protection, as indicated by the much smoother surface relative to the uncoated lithium metal anode after lithium stripping. In addition, the plated lithium from coated lithium has a larger size and lower surface, indicating fewer side reactions with the electrolyte and longer cycle life.

Figure 10:
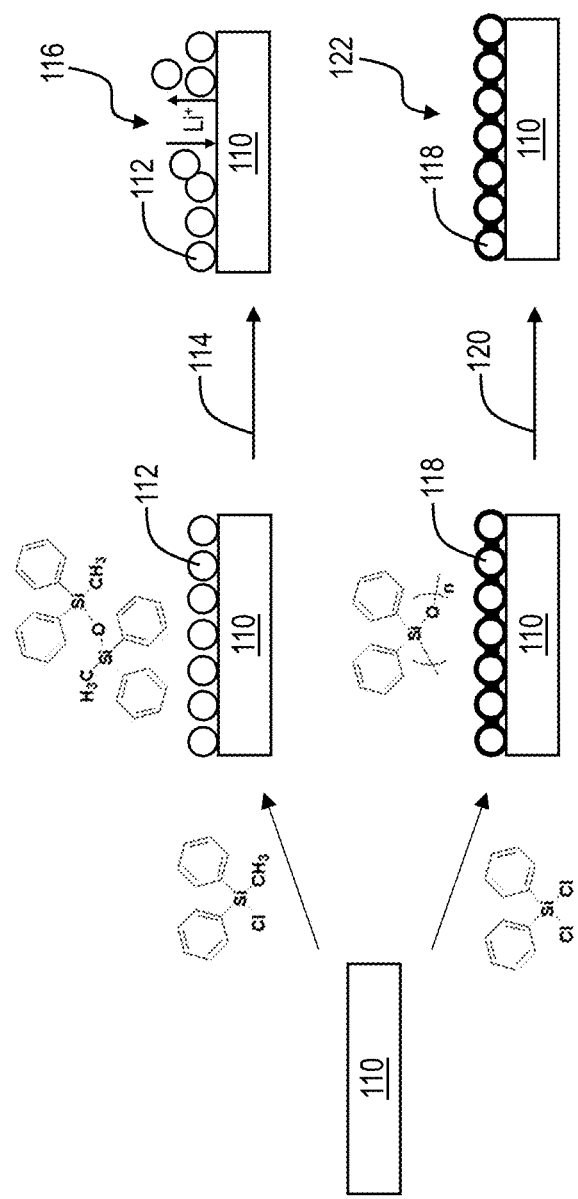
FIG. 10 is an illustration showing improved anode protection provided by a polymer layer prepared in accordance with the current technology relative to the protection provided by a diphenylmethylsiloxane coated onto an anode.

FIG. 10 is an illustration showing improved anode protection provided by the polysiloxane prepared in accordance with the current technology relative to the protection provided by diphenylmethylsiloxane coated onto an anode. In FIG. 10, a lithium metal substrate 110 having a surface comprising, as non-limiting examples, LiOH and Li$_2$O, is shown. On the top portion of the figure, chloro(methyl)diphenylsilane (Ph$_2$MeSiCl) dimerizes on the substrate 110 to form a layer comprising single siloxanes 112, such as diphenylmethylsiloxane. After cycling represented by an arrow 114, the layer comprising the single siloxanes 112 is broken at a location 116. On the bottom portion of the figure, dichlorodiphenylsilane (Ph$_2$SiCl$_2$) polymerizes on the substrate 110 to form a polymeric coating 118 comprising polysiloxanes. After cycling represented by a second arrow 120, the polymeric coating 118 is undamaged at a location 122. Without being bound by theory, the layer comprising single siloxanes 112 breaks between siloxane molecules, which gives lithium ions access to the anode surface. In contrast, the polymeric coating 118 is resistant to breakage and provides lithium ions with little to no surface access.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrode comprising:
    an electrode active material comprising lithium (Li); and
    a polymer layer coating at least a portion of the electrode active material,
    wherein the polymer layer comprises a polymerization product of a monomer having Formula I:

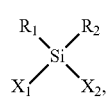

Formula I where R$_1$ and R$_2$ are independently an aryl or a branched or unbranched C$_1$-C$_{10}$ alkyl; and
    X$_1$ and X$_2$ are independently chlorine (Cl), bromine (Br), or iodine (I); and wherein the polymerization product comprises a polymer of Formula II:

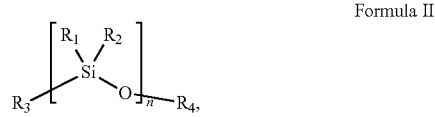

Formula II where R$_1$ or R$_2$ are defined in regard to Formula I;
    R$_3$ is X$_1$, X$_2$, —OH from a surface of the electrode active material, or —OLi from a surface of the electrode active material;
    R$_4$ is Li from a surface of the electrode active material, hydrogen (H) from a surface of the electrode active material, or —SiR$_1$R$_2$X$_{1/2}$; and
    n is an integer greater than 2.

2. The electrode according to claim 1, wherein at least one of R$_1$ or R$_2$ is phenyl.

3. The electrode according to claim 2, wherein the phenyl is substituted with at least one C$_1$-C$_{10}$ alkyl, a halide, or combinations thereof.

4. The electrode according to claim 1, wherein at least one of R$_1$ or R$_2$ is (diphenylphosphino)phenyl.

5. The electrode according to claim 1, wherein at least one of R$_1$ or R$_2$ is fluorenyl.

6. The electrode according to claim 1, wherein at least one of R$_1$ or R$_2$ is C$_1$-C$_{10}$ alkyl.

7. The electrode according to claim 1, wherein the monomer is selected from the group consisting of dichlorodiphenylsilane, dichloro(methyl)phenylsilane, di-p-tolyldichlorosilan, bis[2-(diphenylphosphino)phenyl]dichlorosilane, bis(4-butylphenyl)-dichlorosilane, dimesityldichlorosilane, and bis(9H-fluoren-9-yl)dichlorosilane

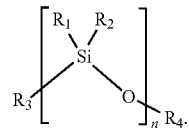

8. The electrode according to claim 1, wherein the polymer layer is substantially free of pores.

9. The electrode according to claim 1, further comprising a current collector, wherein the electrode active material is disposed on the current collector.

10. The electrode according to claim 1, wherein the electrode active material is Li metal.

11. The electrode according to claim 1, wherein the electrode active material comprises a Li alloy comprising the Li and at least one of aluminum (Al), tin (Sn), antimony (Sb), germanium (Ge), or silicon (Si).

12. An electrochemical cell comprising the electrode according to claim 1.

13. The electrochemical cell according to claim 12, wherein the electrode is an anode positioned in the electrochemical cell that cycles Li ions.

14. An electrode comprising:
    an electrode active material comprising lithium (Li); and
    a polymer layer coating at least a portion of the electrode active material, wherein the polymer layer comprises a polymer having Formula II:

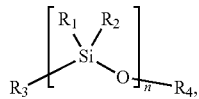

Formula II where $R_1$ and $R_2$ are independently an aryl;
$R_3$ is chlorine (Cl), bromine (Br), iodine (I), —OH from a surface of the electrode active material, or —OLi from a surface of the electrode active material;
$R_4$ is Li from a surface of the electrode active material, hydrogen (H) from a surface of the electrode active material, or —$SiR_1R_2X_{1/2}$; and
n is an integer greater than 2.

15. The electrode according to claim 14, wherein the electrode is an anode and $R_1$ and $R_2$ are the same.

16. The electrode according to claim 15, wherein $R_1$ and $R_2$ are both phenyl, (diphenylphosphino)phenyl, tolyl, butylphenyl, fluorenyl, or mesityl.

17. A method of fabricating an electrode, the method comprising:
applying a monomer solution to at least one surface of an electrode active material comprising lithium (Li), the monomer solution comprising a monomer having Formula I:

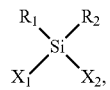

Formula I where $R_1$ and $R_2$ are independently an aryl or a branched or unbranched $C_1$-$C_{10}$ alkyl, and
$X_1$ and $X_2$ are independently chlorine (Cl), bromine (Br), or iodine (I); and
polymerizing the monomer to form a polymer layer coating comprising a polymerization product on at least a portion of the electrode active material, wherein the polymerization product comprises a polymer of Formula II:

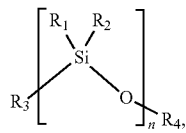

Formula II where $R_1$ or $R_2$ are defined in regard to Formula I;
$R_3$ is $X_1$, $X_2$, —OH from a surface of the electrode active material, or —OLi from a surface of the electrode active material;
$R_4$ is Li from a surface of the electrode active material, hydrogen (H) from a surface of the electrode active material, or —$SiR_1R_2X_{1/2}$; and
n is an integer greater than 2.

18. The method according to claim 17, wherein the applying comprises contacting the at least one surface of the electrode active material with the monomer solution for a time of greater than or equal to about 30 seconds to less than or equal to about 10 minutes, during which time the polymerizing occurs spontaneously to form the polymer layer.

19. The method according to claim 17, further comprising:
rinsing the polymer layer with an inert solvent.

20. The method according to claim 17, wherein $R_1$ and $R_2$ are the same and $X_1$ and $X_2$ are the same.

* * * * *